Jan. 6, 1970  A. KORPEL  3,488,438
DISPLAY SYSTEM UTILIZING BRAGG DIFFRACTION
Filed Dec. 9, 1966  2 Sheets-Sheet 1
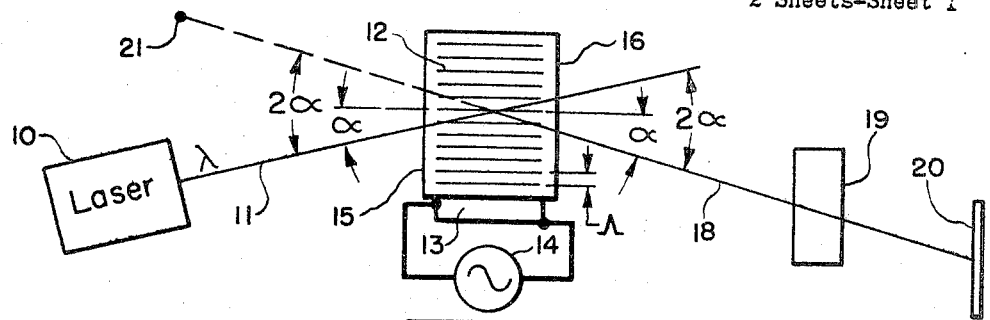
FIG. 1
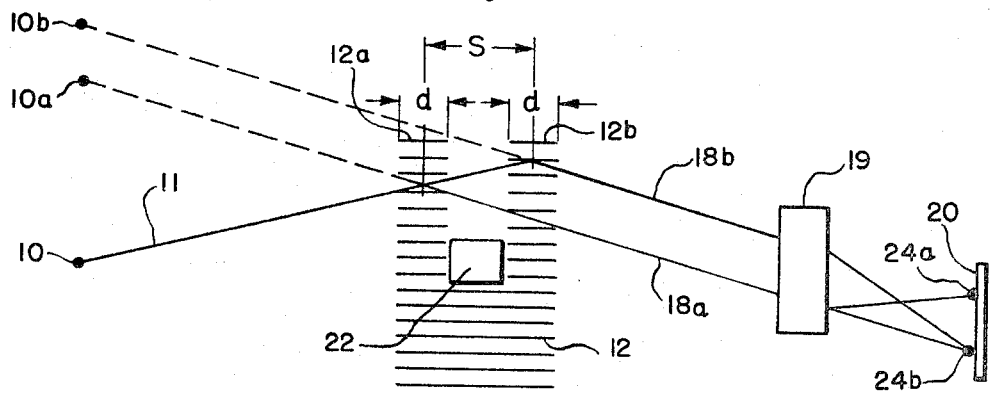
FIG. 2
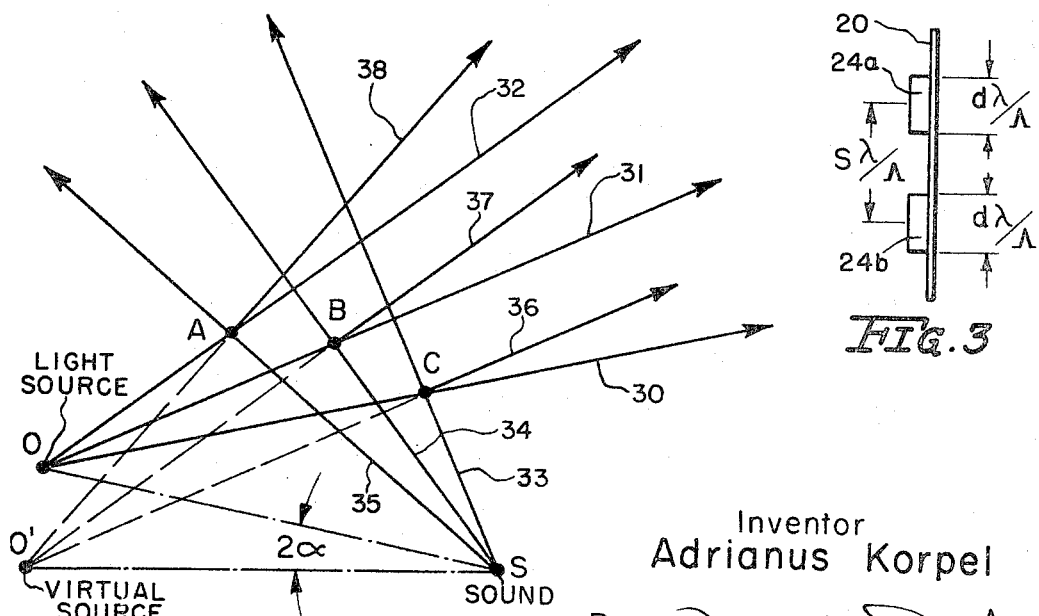
FIG. 3
FIG. 4
Inventor
Adrianus Korpel
By 
Attorney Inventor
Adrianus Korpel By
Attorney

United States Patent Office 3,488,438
Patented Jan. 6, 1970

3,488,438
DISPLAY SYSTEM UTILIZING BRAGG DIFFRACTION
Adrianus Korpel, Prospect Heights, Ill., assignor to Zenith Radio Corporation, Chicago, Ill., a corporation of Delaware
Filed Dec. 9, 1966, Ser. No. 600,499
Int. Cl. H04n 3/16, 5/48
U.S. Cl. 178—7.5                                    5 Claims

ABSTRACT OF THE DISCLOSURE

An acoustic microscope or the like, in which the specimen or object to be observed is placed in the sound-conducting medium of a light-sound interaction cell through which a laser beam is projected. The incident coherent light beam is variably diffracted in a pattern reflecting non-uniformities in the sound field attributable to the presence of the specimen, and an optical system is provided for projecting this pattern onto a remote image plane.

---

The present invention pertains to display systems. More particularly, it relates to a system utilizing interaction between light and sound waves to create an image of an object. As utilized herein, the term "light" includes radiation in both the visible and invisible portions of the spectrum and the term "sound" includes acoustic waves in both the audible and super-audible ranges.

As disclosed in the copending application of Robert Adler, Ser. No. 388,589, filed Aug. 10, 1964, now U.S. Patent 3,431,504 issued Mar. 4, 1969, sound waves are propagated across a beam of substantially monochromatic light in order to diffract a portion of the light at an angle to the undiffracted light. The sound waves interact with the light waves and act as a moving three-dimensional phase grating. This interaction may be utilized to modulate the light beam with signal intelligence, since the amount of light in the diffracted beam is a function of the sound wave intensity. Alternatively, the angle of diffraction of the light changes as the wavelength of the sound is varied so that advantage may be taken of the light-sound interaction to deflect the light beam selectively to different positions. These principles, of both modulation and deflection, have been incorporated successfully into television image-display systems. Both the scanning and the video information are introduced into these systems as signals which are utilized to develop sound waves.

It is a general object of the present invention to provide apparatus which similarly takes advantage of light-sound interaction but which is utilized to provide a display of a physical object or the like brought into association with the apparatus itself.

Another object of the present invention is to provide apparatus which permits nondestructive display-type visualization of objects.

A further object of the present invention is to provide a phase and amplitude image of the cross-section of a sound beam in a plane generally normal to the direction of propagation of the sound.

A more specific object of the present invention is to provide an acoustic microscope.

In accordance with the invention, a system for developing and displaying an optical image of an object to be examined comprises a light-sound interaction cell including a sound-conducting medium and means for producing a uniform-intensity sound wave field throughout the medium. A receptacle is provided for receiving the object to be examined within the sound-conducting medium of the light-sound interaction cell to establish non-uniformities in sound wave intensity in a predetermined portion of the sound-conducting medium. Means are provided for projecting a substantially monochromatic light beam through the predetermined portion of the sound-conducting medium to produce, by Bragg diffraction, an optical image of the sound wave field non-uniformities attributable to the presence of the object under examination. An optical system is provided for projecting the optical image on an image plane.

The features of the present invention which are believed to be novel are set forth with particularity in the appended claims. The invention, together with further objects and advantages thereof, may best be understood, however, by reference to the following description taken in connection with the accompanying drawings in the several figures of which like reference numerals indicate like elements and in which:

FIGURE 1 is a schematic diagram of a known light-sound interaction system useful in explaining the present invention;

FIGURE 2 is a schematic diagram of a similar system arranged for use in accordance with the present invention;

FIGURES 3, 4 and 5 are diagrams which in connection with the detailed description hereafter enables a more complete understanding of the principles underlying the present invention;

Figure 5:
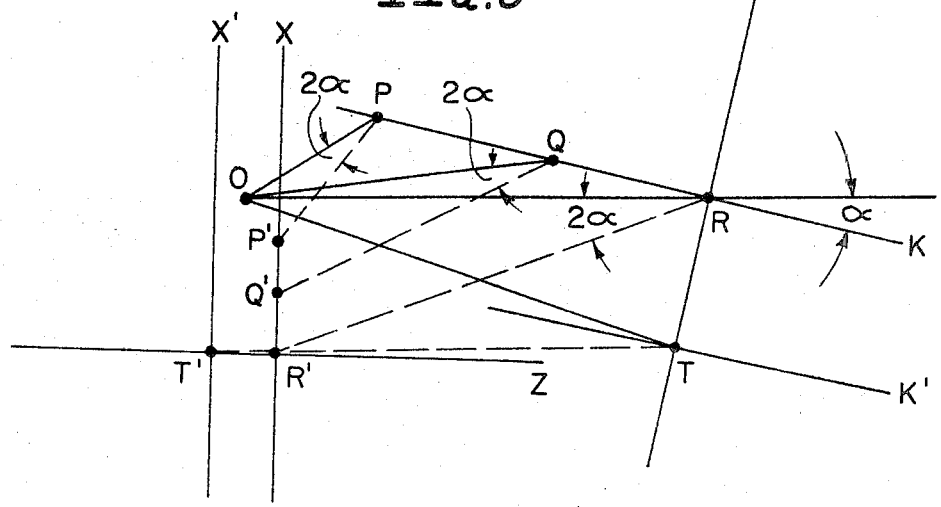

FIGURE 1 illustrates a light-sound interaction system of the kind described in detail in the aforesaid Adler application. Substantially monochromatic light is projected from a source 10, such as a laser, along a beam path 11 across which sound waves having wavefronts 12 are directed. The sound waves are launched by a transducer 13 in response to signals from a source 14. The sound waves propagate in a medium 15 such as water contained in a housing 16 the side walls of which are transparent to the light in beam 11.

Ordinarily, a portion of the light beam continues straight through light-sound interaction cell 16. But under certain conditions to be described a portion of the light is diffracted by the effective phase grating established by the sound wavefronts so as to be redirected along an exit path 18. Disposed in path 18 typically is an optical system 19, such as a telescope, for projecting the light in path 18 onto an image screen or image plane 20.

The angle $\alpha$ between the sound wavefronts and the exiting beam 18 is defined as the diffraction angle. When the incoming or incident light in beam path 11 enters from a direction approximately parallel to the sound wavefronts, and the width of the wavefronts in the direction of light travel is of the same order as the sound wavelength, it can be shown that the light emerging from cell 16 is distributed into a plurality of different beams at various angles referred to as orders. The zero order represents that portion of the light which passes straight through cell 16 while successively higher orders (1, 2, 3 etc.) appear symmetrically to either side of the zero order. The fundamental expression for this diffraction relationship is:

$$\sin \alpha_n = n\gamma/\Lambda \tag{1}$$

where $n$ is an integer denoting the order of the diffracted light pattern, $\Lambda$ is the sound wavelength in the propagating medium and $\gamma$ is the light wavelength also in the medium.

When the light incident upon cell 16, instead of arriving from a direction parallel to the sound wavefronts, is inclined with respect thereto by what is often referred to as the Bragg angle, the moving sound wavefronts 12 act as if they were ordinary mirrors and the light which is diffracted by the sound waves emerges from cell 16 in a single order with the exit angle of reflection being equal to the incident Bragg angle. Such Bragg diffraction occurs when $$\sin \alpha = \pm \gamma/2\Lambda \qquad (2)$$

In typical applications, the actual value of the angle $\alpha$ is sufficiently small that the sin terms in Equations 1 and 2 may be replaced by the value of the angle itself, so that, for example, Equation 2 becomes $$\alpha = \pm \lambda/2\Lambda \qquad (3)$$

The $\pm$ signs, in relationship to cell 16, represent angular direction respectively below or above the direction defined by the sound wavefronts. That is, the $\pm$ sign indicates that Bragg diffraction can be obtained at an angle $\alpha$ either below or above a line parallel to the sound wavefronts.

FIGURE 1 has been drawn to represent the Bragg diffraction relationship, with the angles of incidence and reflection being equal and with the diffracted light forming an angle with the undiffracted light at twice the Bragg angle or $2\alpha$. As viewed from image plane 20, the light in beam 18 appears as if it were coming from a source 21. That is, source 21 is the virtual source of the light.

The propagating sound waves in cell 16 represent a sound field. Along the sound wavefronts in FIGURE 1, transverse to the sound propagation direction, the sound field is of uniform intensity. The diffraction response with respect to light waves incident upon the sound waves at or in the vicinity of the Bragg angle is determined by the far field of the sound. A "far field" is the composite effect resulting from a plurality of individual effects ocurring at or near the source of the composite field effect, at the place of the "near field." In FIGURE 1, the near and far fields of the sound are the same because of the uniform intensity (or sound pressure) across the sound wave-fronts throughout their travel.

In acocrdance with the invention, the near field of the sound is caused to be non-uniform across the width of the wavefronts and the light beam is caused to have an actual effective degree of angular spread so that the far field of the diffracted light is modified by the resulting far field of the sound. In consequence, the non-uniform sound radiation pattern is in a sense impressed upon the light radiation pattern. In the systems to be discussed, the near field of the sound is reconstructed purely by optical means from the modification of the far field of the diffracted light in order to obtain an image of the non-uniform sound field. Stated another way, a pattern of sound pressure variation along the sound wavefronts, transverse to the sound propagation, is caused to be reproduced in an image created by the diffracted light.

FIGURE 2 represents in simplified form one embodiment for the achievement of these ends. In FIGURE 2, sound wavefronts 12 are created as in FIGURE 1 but source 14 and transducer 13 are omitted for convenience. Similarly, laser 10 is replaced by a qausi point source of light in this figure. Centrally disposed within the path of sound wavefronts 12 is a solid object 22 as a result of which a portion of the sound wavefronts are blocked. From along either side of object 22 separate series of sound wavefronts 12a and 12b are projected across the path 11 of the light from source 10. Thus, in a transverse plane through object 22, the near field of the sound actually is composed of two spaced sound waves each of finite width $d$. However, as viewed at a position on beyond object 22, where the light beam intercepts the sound waves, the far field of the sound is a pattern having two high-pressure regions separated by a low-pressure region; the latter in this case is essentially of zero intensity.

A portion of light beam 11 is deflected off wavefronts 12a to create a first diffracted beam 18a emerging from the sound waves. Another portion of light beam 11 continues on through wavefronts 12a and is diffracted by wavefronts 12b to emerge from the sound waves along a path 18b. Exiting light in both paths 18a and 18b is focused by an optical system 19 upon image plane 20 to form respective spots of light 24a and 24b. As viewed from image plane 20, spots 24a and 24b appear to come from virtual sources 10a and 10b, allowing for image reversal in optical system 19. Of key significance, sources 10a and 10b represent not only individual virtual light sources but together they also define a virtual sound image. This arises because each of these virtual sources is produced by interaction of the incoming light with a region of high sound pressure and the two regions are separated by a distance corresponding to the width of the zero-pressure region caused by object 22. That is, the resultant image on screen 20 represents light appearing to come from the virtual sources and the position of those virtual sources is representative of the sound pressure pattern across the sound path.

The light diffracted and seemingly originating from virtual sources 10a and 10b has an angular spread approximating the quantity $\lambda/d$, where $d$ is the individual width of the pair of wavefronts 12a and 12b separated by object 22. That is, the diffracted light in each of paths 18a and 18b has an angular spread corresponding to the interaction length $d$. Viewing virtual sources 10a and 10b as each defining an image of size $d'$, $$\gamma/d' = \lambda/d \qquad (4)$$

which may conveniently be rearranged as $$d' = d\gamma/\lambda \qquad (5)$$

The quantity $\gamma/\Lambda$ may be termed the demagnification factor. Actually, the light distribution within the angle $\lambda/d$ exhibits a typical $\sin x/x$ function so that the virtual images are of a rectangular size $d\gamma/\lambda$.

Stated another way, with object 22 causing the formation of two separated sound waves 12a and 12b each having wavefronts of width $d$, two rectangular areas of light 24a and 24b are produced on image plane 20 as shown in FIGURE 3, each being of a height $d\lambda/\Lambda$ assuming unity magnification in optical system 19. With a center-to-center separation between sound wavefronts 12a and 12b of $s$, Bragg diffraction results in the two images 24a and 24b being separaetd by the quantity $s\lambda/\Lambda$. Thus, when $s=d$, the two images 24a and 24b just touch to form one rectangle of width $2d\lambda/\Lambda$.

The foregoing analysis assumes that the light originates from a point source radiating isotropically. The limit of resolution is established by the criterion that the virtual image size $d'$ cannot be made smaller than approximately $\frac{1}{2}\Lambda$ which in turn means that the smallest detail that can be resolved in the sound beam is that of a size approximating $\frac{1}{2}\Lambda$. For the latter ultimate limit, the incident light might have a spread of $\pi$ radians.

The manner in which the sound radiation pattern appears as if it were impressed upon the light radiation pattern may be understood more clearly from a consideration of FIGURE 4 in terms of ray optics. In that figure, a two-dimensional source of diverging light O, i.e., having all rays in the plane of the paper, illuminates a diverging sound field produced by an elementary Huyghens point source S. That is, source S represents any one point along a sound wavefront, such as along either a wavefront 12a or 12b in FIGURE 2. Various sound and light rays are drawn respectively from these two sources in such a manner that the points of their intersection A, B and C satisfy the Bragg relationship of Equation 2. Thus, the angle between the incident light rays and the sound wavefronts equals the Bragg angle $\alpha$.

With the original light rays being designated 30, 31 and 32, the interaction with the respective sound rays 33, 34 and 35 results in respectively diffracted light rays 36, 37 and 38. Extending the latter diffracted rays backwardly, it is shown by simple geometry that all cross at the same virtual source point O'. Because of the intensity of the diffracted light is proportional to the sound pressure for weak scattering, point O' is the virtual image of sound source S. That is, because the virtual source is produced by the action of a point of sound pressure, the virtual source may be thought of as representing a virtual image of that point source of sound as well as being a virtual light source. Thus, the virtual light source also becomes the virtual sound source by reason of the light-sound interaction.

It is also established geometrically that the lines OSO' depict an isosceles triangle with an apex angle equal to $2\alpha$. This affords a convenient construction for locating virtual images in such a diagram as has been done in FIGURE 5 when order to illustrate the image transformation property. Whereas FIGURE 4 depicts the points of interaction between the rays from one sound point and the rays from one light point, FIGURE 5 omits the rays for clarity and instead shows the relative positions of a plurality of real and virtual image points. In FIGURE 5, virtual points P', Q' and R' are situated on a vertical axis $x$. Considering each of these points to represent a point in a virtual image of a sound field pattern, i.e., representative of individual respective points across the far field of the sound, it is instructive to locate the real sound points. Constructing isosceles triangles with OP', OQ' or OR' as bases and with apex angles $2\alpha$, it is found that the real Huyghens sound sources are points P, Q and R. Again by necessary geometry, all of points P, Q and R lie on an axis K which is inclined at Bragg angle $a$ with respect to the horizontal or $z$ axis perpendicular to the $x$ axis. Thus is, P, Q and R represent real points of a sound image which may be imaged from their corresponding virtual points P', Q' and R'.

By virtue of the fact that $a$ as usual is a small angle, an examination of FIGURE 5 reveals that the real image of the actual individual sound source points along axis K is rotated by almost 90 degrees from virtual image axis $x$. It is for this reason that the technique of the present invention renders it convenient to obtain an image of a sound cross-section perpendicular to the propagation direction of the sound. Referring to FIGURE 2, this is why the image developed on image plane 20 located vertically depicts the horizontal cross-section of the sound waves blocked in part by object 22 and hence enables a representation of object 22 to be developed on the image plane.

Further inspection of FIGURE 5 reveals that the imaging process involves a demagnification factor M in accordance with the relationship.

$$M = P'Q'/PQ \qquad (6)$$

Moreover the factor M equals the ratio of light wavelength to sound wavelength so that $$M = 2 \sin a = \lambda/\Lambda, \qquad (7)$$

a number which as indicated is typically much smaller than unity.

Performing the same kind of isoceles triangle construction on a real Huyghens sound source T in FIGURE 5, located on a cross-section or axis K' parallel to axis K reveals that cross section K' is imaged on a vertical virtual axis $x'$ parallel to $x$. Again, the same demagnifiication ratio applies so that $T'R' = MTR$. This points up that, with the same light-sound interaction system, it is possible to produce an image of different sound-wave cross-sections spaced along the direction of sound propagation. That is, the K-axis cross-section appears along virtual axis $x$, while the K' axis cross-section appears along the $x'$ virtual axis. It will also be observed that phase is preserved in this imaging process, leading to the use of the present technique in constructing sound holograms.

It may be noted that the minimum resolvable detail is limited to $1/M$ times the size of the source of light. This cannot be smaller than half a wavelength of the sound divided by the numerical aperture of the bundle of incident light rays.

The discussion thus far of FIGURES 2–5 has been limited to one order of diffracted light as occurs when the light in a small-diameter well-collomated beam is incident upon the sound waves at the Bragg angle. However, the technique is not at all limited to this arrangement. Instead, either a diverging or converging beam of light directed across the sound waves will produce the results analyzed in FIGURES 4 and 5. That is, the individual interaction between the light rays and the sound waves as illustrated in FIGURE 4 does occur in accordance with the Bragg relationship, but this does not require that a Bragg relationship exists between the incoming light-beam path and sound wavefronts. With diffraction in accordance with Equation 1, the same analysis as developed with respect to FIGURES 4 and 5 reveals that, where that analysis is applicable to a positive first order diffraction, there is similar diffraction in the minus first order as a result of which an image of the sound field is created which is also a mirror image of the one created by the positive first order. However, higher orders of diffracted light usually do not appear in the illustrated system because of the low degree of sound pressure developed.

Figure 6:
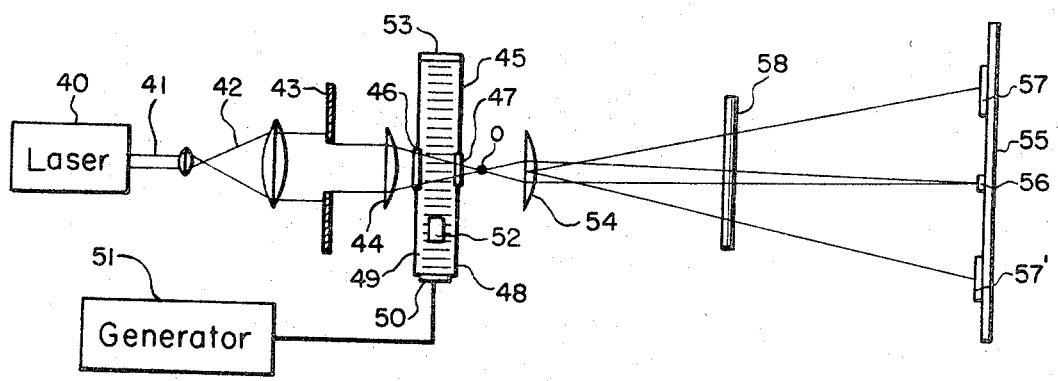
FIGURE 6 is a schematic diagram of a complete system constructed in accordance with the invention.

FIGURE 6 schematically represents a successful complete embodiment utilizing the techniques of the present invention. A helium-neon laser 40 develops a beam 41 of 6328 Angstrom light. Beam 41 is enlarged in cross-section by a telescope 42 and then collimated by an aperture in a plate 43. The collimated beam is then focused into a line source at O by a cylinder lens 44. Thus, a converging beam of light enters into and exits from a sound cell 45 by way of transparent windows 46 and 47. In this case, line source O is formed to the right or beyond sound waves 48 so that the resultant images are real rather than virtual as previously analyzed. Sound waves 48 are launched in water 49 contained by cell 45 through the action of a transducer 50 driven by a signal generator 51. The object 52 under study is disposed in the path of sound waves 48 ahead of the light beam. To prevent sound-wave reflection, an acoustic absorber 53 preferably is disposed opposite transducer 50.

Beyond the real line source O is a cylinder lens 54 which acts to project the effective line source O onto image screen 55 to form an illuminated area 56. At the same time, cylinder lens 54 projects a pair of images of a selected sound cross-section onto screen 55 to define images 57 and 57' corresponding respectively to the positive and negative Bragg angles of diffraction. Preferably, cylinder lens 54 is assigned a magnification value of $1/M$, so as to cancel the demagnification inherent in the basic process.

Imaging in the orthogonal direction, vertical to the plane of the drawing, is obtained simply by virtue of the light collimation. No demagnification is involved in this orthogonal direction so that a cylinder lens 58, which has its curvature at right angles to cylinder lenses 55 and 54, projects the image with a magnification of unity. Finally, by changing the position of cylinder lens 54 along the light path, toward or away from sound cell 45, sound cross-sections at different points along the sound waves are brought into focus on screen 55; as here illustrated, cylinder lens 54 is positioned to image an object 52 disposed in the sound path.

In an exemplary system, the frequency of the sound is 22 megahertz which corresponds to a wavelength $\Lambda$ in water of 0.07 millimeter. The demagnification involved is $1/440$, the width of the effective line source O is 6 microns and the minimum resolvable detail is about 0.8 millimeter, or 12 wavelengths of the sound which roughly corresponds to the numerical aperture of the beam. In this case, transducer 50 is rectangular having dimensions of approximately 18 x 12 millimeters.

Figure 7:
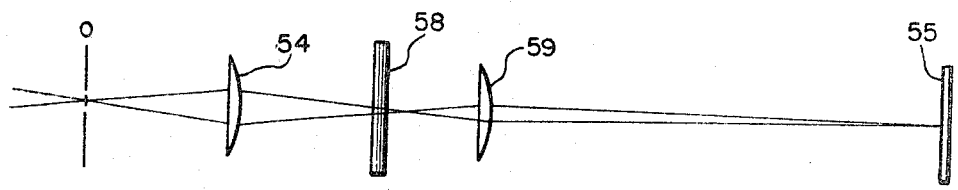
FIGURE 7 schematically depicts a modification of a portion of the apparatus of FIGURE 6.

Another and only slightly different system is like FIGURE 6 except that, as shown in FIGURE 7, another cylinder lens 58 and image screen 55. The remainder of the FIGURE 7 system is the same as in FIGURE 6. In this case, telescope 42 is of ×10 power, cylinder lens 44 has a focal length of about 17 centimeters, cylinder lens 54 has a focal length of about 4.5 centimeters as does cylinder lens 59, whereas cylinder lens 58 in the orthogonal plane has a focal length of about 330 centimeters. The distance was about 38 centimeters from sound cell 45 to cylinder lens 58 and about 254 centimeters from the latter to screen 55. At the same time, there is about 49 centimeters separation between cylinder lenses 54 and 59 and it is 225 centimeters from the latter to screen 55. Magnification of the particular system of FIGURE 7 is approximately 5 power. In this system, lenses 54 and 58 image the effective line source onto the screen while the orthogonal cylinder lens 58 images the center of sound cell 45. The system readily displays an object having a transverse dimension of but 1 millimeter.

In FIGURES 6 and 7, the effective line source O is positioned after the sound cell. It is in some cases advantageous to locate it instead in front of the sound cell. In that position, a plate having a narrow slit of just sufficient width to pass the "line" of light may be disposed at the line source position to block passage of any scattered light.

Instead of utilizing cylinder lens as illustrated, any of a variety of known astigmatic optical systems may be employed to produce either a real or a virtual source and to image onto a selected viewing plane as described. Also, known optical arrangements may be used to view the phase pattern instead of the amplitude pattern of the diffracted light.

In operation of both the systems of FIGURES 6 and 7, small objects such as wires, apertured plates and gears placed in the path of the sound waves have been reproduced upon the image screen. Thus, the devices act as acoustic microscopes and in this environment the techniques are particularly valuable at still higher sound frequencies. It is to be noted that any selected cross-section in the sound wave path can be brought into focus merely by optical manipulation and without changing the relative position of the light and sound beams.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. A system for developing and displaying an optical image of an object to be examined, which system comprises:
   a light-sound interaction cell including a sound-conducting medium and means for producing a sound wave field of substantially uniform intensity throughout said medium;
   a receptacle for receiving the object to be examined within said sound-conducting medium to establish non-uniformities in sound wave intensity in a predetermined portion of said sound - conducting medium;
   means for projecting a substantially monochromatic light beam through said predetermined portion of said sound-conducting medium to provide an optical image of such sound wave field non-uniformities by Bragg diffraction of the incident light beam;
   and an optical system for projecting said optical image on an image plane.

2. A system as defined in claim 1, which further comprises cylindrical lens means for focusing said beam into an effective line source extending transversely to the rays of the light beam and to the direction of propagation of sound waves in said sound-conducting medium.

3. A system according to claim 2, in which said effective line source is external to said light-sound interaction cell.

4. A system according to claim 1, in which said optical system includes at least one magnifying element to provide a magnification factor which compensates for that of said light-sound interaction cell.

5. A display system comprising:
   means for producing a beam of substantially monochromatic light focused into an effective line source disposed transversely to the beam;
   means for directing sound waves across said beam;
   means for receiving an object in the path of said sound waves ahead of the path of said beam;
   and optical means disposed in the path of said beam for imaging said line source and projecting an image of said object on an image plane, in which said imaging means has a magnification factor compensatory to the magnification factor inherent in interaction between said beam and said sound waves.

References Cited

UNITED STATES PATENTS 3,419,322  12/1968  Adler _____ 350—161

JOHN W. CALDWELL, Primary Examiner

ROBERT L. RICHARDSON, Assistant Examiner

U.S. Cl. X.R.

73—67.5; 340—5; 350—161